FIG. 1  FIG. 2  FIG. 3  FIG. 4

INVENTORS
GABRIEL BOULADON
PAUL ZUPPIGER
BY Gray, Mase &
Dunson
ATTORNEYS

United States Patent Office 3,431,866
Patented Mar. 11, 1969

3,431,866
CLOSED LOOP PASSENGER TRANSPORT COMPLEX
Gabriel Bouladon and Paul Zuppiger, Geneva, Switzerland, assignors to The Battelle Development Corp., Columbus, Ohio, a corporation of Delaware
Filed Oct. 31, 1966, Ser. No. 590,827
Claims priority, application Switzerland, Oct. 29, 1965, 14,980/65
U.S. Cl. 104—25                                5 Claims
Int. Cl. B61b 3/00, 1/00, 13/10

ABSTRACT OF THE DISCLOSURE

Continuous, endless passenger transport complex for connecting a main station with at least two secondary stations.

An endless series of transport units is provided for each connection. Each unit of a series is continuously moved along guide means, at low speed in each of its stations and at high speed between stations. Each guide means for a series has in common with the others a main portion along which the units of each series travel at high speed and interleaved with the units of the other series, thus forming groups in which the units are ordered in an invariant succession.

---

This invention relates to a continuous and endless passenger transport complex with multiple destinations, for connecting, both in the "out" direction and in the "in" direction, a main station, provided with a plurality of platform means with one such platform means for each destination, to at least two secondary stations, each provided with platform means, one of said secondary stations being remote from and the other near to said main station. This complex comprises at least two continuous and endless, variable speed, transport installations, each dealing with the traffic to and from one of said secondary stations and each including a set of transport units, each of which is provided with a floor, two longitudinally extending walls and two transversely extending walls, the latter being retractable, and closed loop guide means along which said transport units are movable. These guide means include, in succession, an unloading section, a return loop, a loading section, all three being arranged within a station and being travelled along by said units at low speed and in close formation, a double line transport section which is travelled along by said units in the "in" and "out" directions at high speed and in open formation, two acceleration sections each arranged between a loading section and one line of the transport section and travelled along by said units at an increasing speed and in a progressively opening formation, and two deceleration sections each arranged between one line of the transport section and an unloading section and travelled along by said units at a decreasing speed and in a progressively closing formation. Each of these installations includes moreover a drive system adapted to impart to the transport units of this installation a speed which varies between said low speed and said high speed.

Several continuous and endless, variable speed, passenger transport systems are known. Among the systems which comprise a set of units moving at variable speed along closed loop guide means, reference may be had to the Kruckenberg system which is described in French Patent No. 619,659, the Stephens-Adamson system which is disclosed in French Patent No. 1,078,728 and the Bouladon-Zuppiger system which is disclosed in Swiss Patent No. 385,732. In all three of these systems, the guide means comprises sections along which the transport units travel at low speed and sections along which these units travel at high speed: the first enable passenger boarding and alighting and are located within the stations; the second are for transport purposes as such and are located between the stations.

There are two ways of dealing, by means of the systems, with traffic between a main station and several secondary stations, i.e., multiple destination traffic:

(a) Resort may be had to several transport systems, each dealing with traffic to and from one of the secondary stations. This solution is costly insofar as each of the installations comprises parts which perform similar functions but with a low degree of effective use. This is in particular true of the transport sections of the guide means, along which sections gaps form between the high speed moving units: the guide means are therefore unused in these gaps. However, the "commercial speed" that can be reached with this type of solution is high since the traffic with each of the destinations is direct.

(b) Resort may be had to a single transport system having guide means which extend successively through each of the secondary stations. This solution is less costly since it only requires one transport installation, but the passengers are obliged to pass through, at low speed, all of the stations located between the main station and the secondary stations constituting the individual destinations. Because of the resulting successive accelerations and decelerations, the "commercial speed" of conveyance is all the more slow when the number of secondary stations to be passed through before reaching the final destination is high.

The transport complex provided by the invention seeks to combine the advantages of the first solution (direct traffic between the main station and each secondary station) and those of the second solution (low cost installation). This transport complex is characterized in that at least a portion of the guide means associated with an installation serving a remote secondary station constitutes at least a portion of the transport section of the guide means associated with an installation serving a near secondary station, the ends of this common portion of the two transport sections forming divergence and convergence points of these two guide means, in that, in a near secondary station, at least the return loop of the guide means associated wih the installation serving this secondary station is off-set vertically in relation to the transport section of the guide means associated with any installation serving a remote secondary station, in that, at said points of convergence, the distance between two successive transport units of the installation serving the near secondary station enables a group of units including one unit from each of the installations serving a remote secondary station to fit in between these two successive units, in that the drive systems belonging to each of the installations are synchronized so that, within each group, the units belonging to one of the installations follow those belonging to another installation in an unvarying order of succession, and in that, in the main station, the return loop of the guide means associated with an installation serving a near secondary station is located on the outside of the return loop of the guide means associated with an installation serving a remote secondary station.

An embodiment of the transport complex according to the invention will now be descirbed by way of example with reference to the accompanying diagrammatic drawings, in which.

Figure 1:
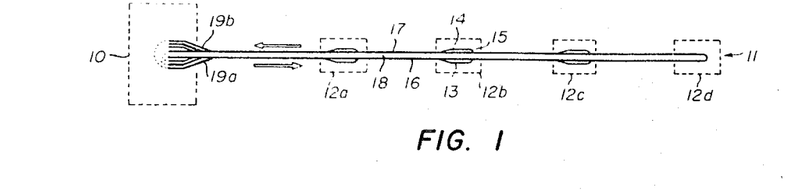
FIGURE 1 is a general outline of this embodiment as whole.

The transport complex shown in FIGURE 1 connects a main station 10 to four secondary stations 12a, . . . 12d, of which station 12a is a near station, station 12b is, in relation to station 12a, a remote station and, in relation to station 12c, a near station, and so on station 12d being a remote station.

Each station, for instance station 12b, includes an alighting section 13, a boarding section 14 and a return loop 15 which, in this particular instance, is downwardly off-set to form an under-pass. Sections 13 and 14 are respectively connetced to the "out" line 16 and to the "in" line 17 of the common transport section 18 which, in order to reach the following stations 12c and 12d, crosses without change of level over the return loop 15. In the main station 10 is to be seen the fan-like arrangement 19a formed by the four link sections following the four boarding sections, and the fan-like arrangement 19b provided by the four link sections preceding the four alighting sections.

Figure 2:
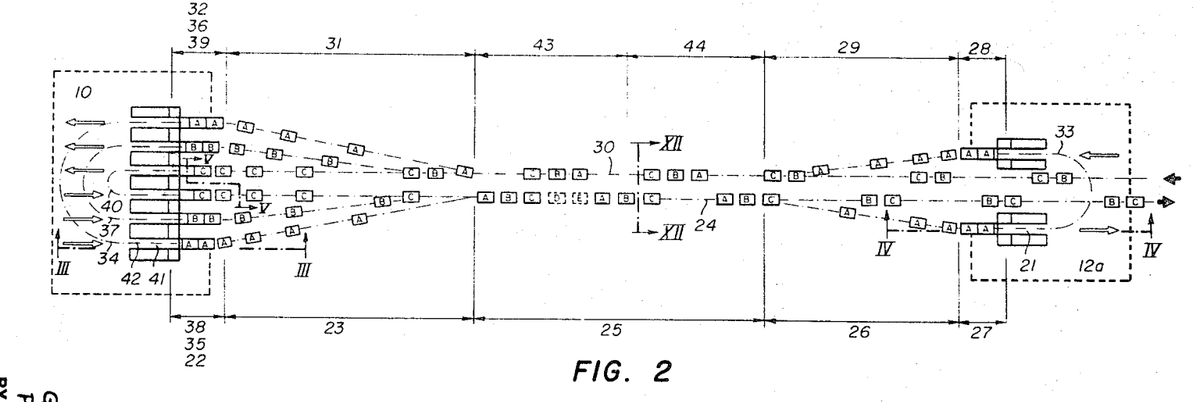
FIGURE 2 is a plan view, on an enlarged scale, of a portion of this embodiment.

FIGURE 2 shows in greater detail the lay-out of the main station 10 and that of the first secondary station 12a, and moreover shows the arrangement of three sets of transport units for dealing with the traffic between the main station 10 and each of the three secondary stations. The units of one set are distinguishable from those of another unit by their letter: thus all uints carrying letter A belong to the set dealing with traffic to and from the secondary station 12a, the units carrying the letter B belong to the set dealing with traffic to and from the following secondary station 12b, not shown in FIGURE 2 but visible in FIGURE 1, and so on. FIGURE 2 also shows the relative disposition of the main components formed by the boarding section 22 which deals with traffic to the secondary station 12a, the link section 23 which connects the boarding section 22 to the "out" line 24 of the common transport section 25, the link section 26 which connects this "out" line to the alighting section 27 of the secondary station 12a, the boarding section 28 of this secondary station, the link section 29 which connects this boarding section 28 to the "in" line 30 of the common transport section 25, the link section 31 ending at the alighting section 32 which, in the main station, deals with in-coming traffic from the secondary station 12a. In this figure have also been sketched in the return loop 33 which is located in the secondary station 12a and which is downwardly off-set, and the return loop 34 which is located in the main station 10 and which is also downwardly off-set. The circuit just described is travelled along by the transport units of set A. Similar circuits are travelled along by the units of set B and of set C, with the difference that the associated units proceed along the common transport section which runs straight through the secondary station 12a and level therewith. The three boarding sections and the three alighting sections located in the main station 10 are grouped in pairs, each of which deals with the traffic between the main station and one particular secondary station and is travelled along by the transport units of one of the sets. Thus, the boarding section 22 and the alighting section 32 which deal with the traffic to and from the secondary station 12a, constitute a pair which is travelled along by the units of set A. These two sections are connected to one another by the associated return loop 34. The same applies to the boarding section 35 and to the alighting section 36 which deal with the traffic to and from the following secondary station and which are travelled along by the transport units of set B; these sections constitute a second pair which is surrounded by the first and are connected by the return loop 37, off-set downwardly. The same also applies to the pair made up by the boarding section 38 and by the alighting section 39 which deal with the traffic to and from a further secondary station: these sections are connected by the downwardly off-set return loop 40 and this pair is framed in by the previous pair.

Figure 3:
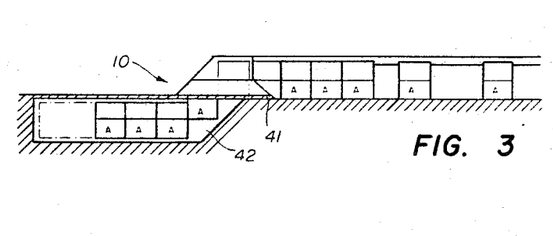
FIGURE 3 and 4 are sections taken along lines III—III and IV—IV of FIGURE 2.
Figure 4:
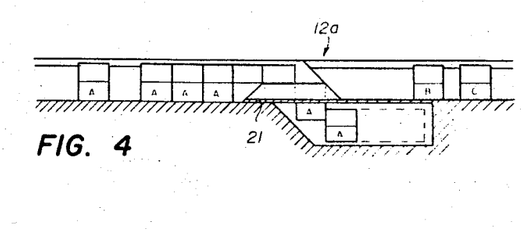

FIGURES 2, 3 and 4 show moreover, diagrammatically, part of the platform equipment. Fixed stages, for instance stage 41 in the main station 10, are arranged in cantelevered manner over the end portion of the return loop 34 associated with the boarding section 22. The same applies to each boarding section and to each alighting section, both in the main station and in the secondary stations, as is apparent from FIGURE 4 in connection with the secondary station 12a, where the stage 20 is to be seen projecting in cantelevered manner over the end portion 21 of the return loop 33 associated with the landing section 27.

The guide and drive system, which will be described in greater detail further on, compels the units of a set to travel over the boarding and alighting sections at low speed and in close formation within which the units contact one another, as shown in FIGURE 2. The guide and drive system respectively accelerates and decelerates the units along the link sections and moves them along the common transport section at high speed and in open formation within which the units of a set are spaced from one another. This system is adapted to convey the units and to synchronize their movements in a manner such that they are distributed along the common transport section in successive groups, such as groups 43 and 44, wherein a unit of set C precedes a unit of set B, which in turn precedes a unit of set A, etc., and in a manner such that this sequential order remains invariable.

Figure 5:
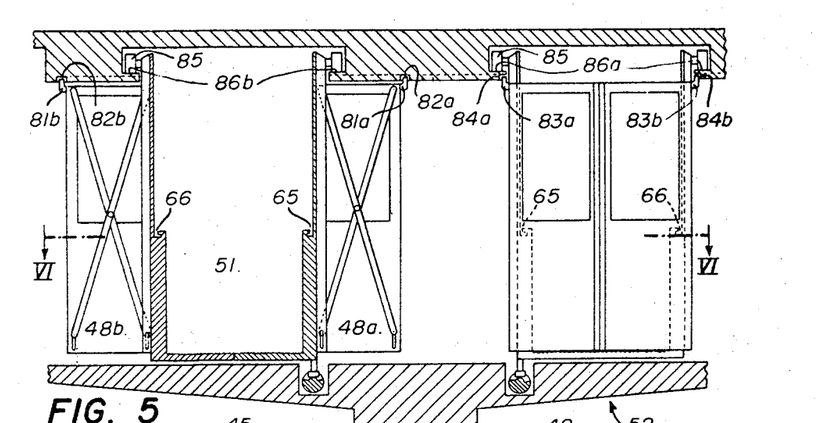
FIGURE 5 is a section taken along the line V—V of FIGURE 2.
Figure 6:
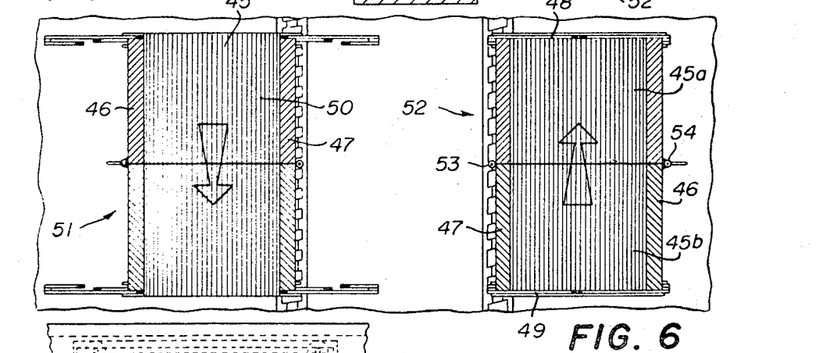
FIGURE 6 is a section taken along line VI—VI of FIGURE 5.
Figures 7, 7A:
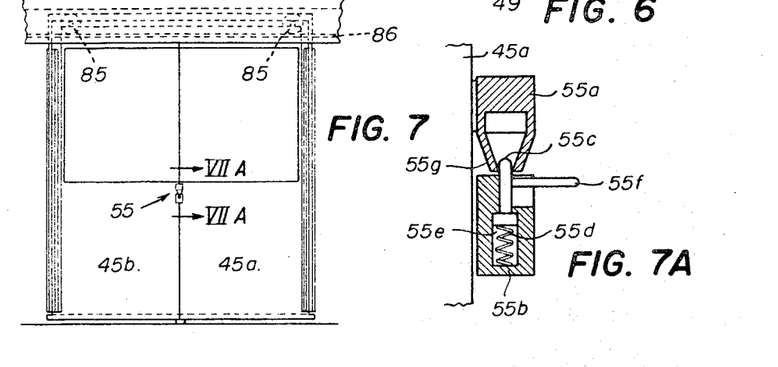
FIGURE 7 is a side view of FIGURE 5.
FIGURE 7A is a section, on an enlarged scale, of a device visible in FIGURE 7.

The transport units comprise (see FIGURES 5, 6 and 7) a floor 45 formed with longitudinally extending grooves 50, two longitudinally extending fixed walls 46 and 47, and two laterally movable transverse walls 48 and 49, which are shown in FIGURES 5 and 6 in open position, in the case of unit 51, and in closed position, in the case of unit 52. These units are suspended by rollers 85 on the guide system which, in the present embodiment, consists of a two-rail overhead track 86 forming two lines 86a and 86b. To reduce as much as possible the radius of the return sections, and hence the space they occupy, the transport units are divided into two halves, as will be observed in FIGURE 6 where unit 52 is divided into two halves 45a and 45b which can pivot about a hinge 53 provided in the longitudinal wall 47 on the inside of the return loop. These two halves are locked to one another by a locking device 55 mounted on the longitudinal wall 46 on the outside of the return loop, opposite wall 46. This locking device, which is shown in greater detail in FIGURE 7A, comprises two hollow members of which one, 55a, is secured on the half 45a and the other, 55b, is secured on the half 45b, and further comprises a bolt 55c urged upwardly by a spring 55d housed in a chamber 55e in member 55b. This bolt thus tends to project out of member 55b and into member 55a, thereby coupling these two members and hence locking the two halves 45a and 45b. A stud 55f enables the locking device to be opened by lowering the bolt 55c. The member 55a has a frusto-conical end portion to enable automatic locking action when the two halves 45a and 45b close: bolt 55c is depressed upon coming into contact with the frusto-conical portion 55g of member 55a and is then projected into the latter by the spring 55d. The locking device is only opened, under the action of a cam 55h acting on stud 55f, when the units enter the return loops, after having reached the bottom of a downward off-setting ramp 56 (FIGURE 8), where they divide into two halves such as 57a and 57b angularly held together by the hinge 53 with the locking device 55 opened.

The retractable transverse walls, such as wall 48 in FIGURES 5 and 6, consist of two panels 48a and 48b which open by sliding in a plane normal to the direction of travel of the units under the action of an automatic opening and closing mechanism. This mechanism, which will be described in greater detail further on, is adapted to close the walls when the units leave a boarding section and to open them when the units reach an alighting section, this being diagrammatically represented in FIGURE 8 by the chain-dotted lines 78a, 78b and 79a, 79b.

Figures 8, 9, 9A:
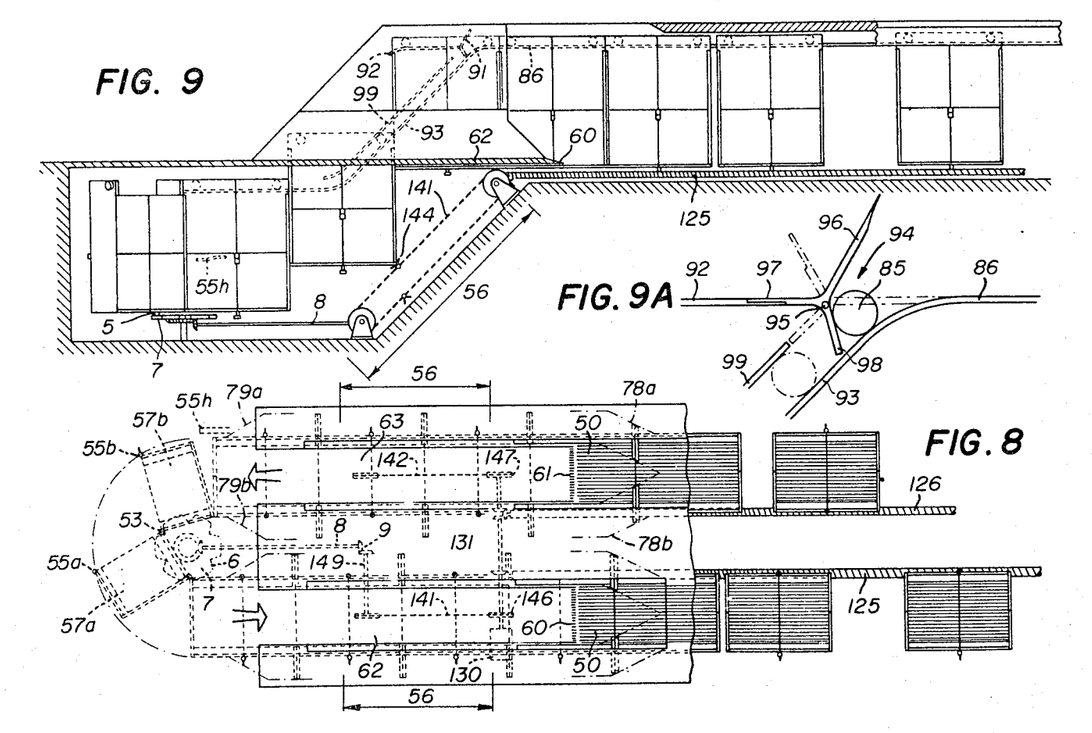
FIGURE 8 is a detailed plan view and FIGURE 9 is a detailed elevational view of a portion of FIGURE 2.
FIGURE 9A illustrates on an enlarged scale a detail of FIGURE 9.

The stages are each provided at their free end with a horizontal comb, such as the combs 60 and 61 of stages 62 and 63 visible in FIGURE 8, whose teeth cooperate with the longitudinal grooves 50 formed in the floors of the units. In this way, passengers step on or off the transport units in the direction of travel of the latter as they would step on or off an escalator. For greater convenience, hand-rails 65 and 66 (FIGURE 5) are provided on the inside of the fixed longitudinal walls.

The guide and drive system has, as indicated above, two functions:

(a) Driving the units of each of the sets A, B and C (FIGURE 2) at variable speed along the boarding, alighting and link sections and along the return loops with which they are associated, and driving all of these units, without distinction of destination, at high speed as soon as they reach the common transport section. This function is carried out by the drive means of the guide and drive system; and (b) Guiding the units along the various sections and particularly, at these locations where link sections branch off from the common transport section (points of divergence), switching them onto the link sections associated with the set to which the units belong, or, at those locations where link sections merge with the common transport section (points of convergence), engaging them onto this common section. This function is carried out by the guide means of the guide and drive system.

Figures 14, 14A, 17:
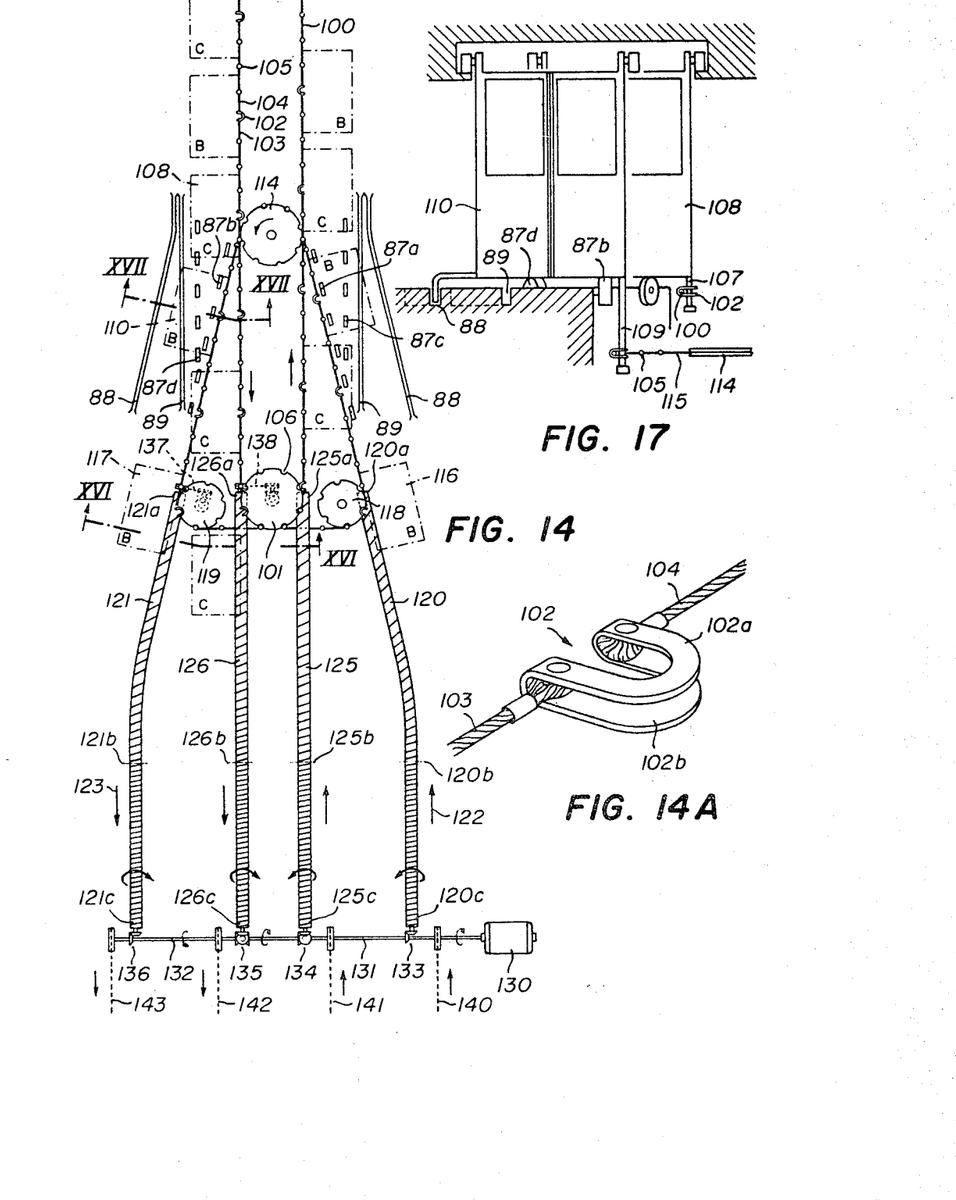
FIGURE 14 is a plan view of the drive system.
FIGURE 14A is a perspective view of a detail of FIGURE 14.
FIGURE 17 is cross-section of FIGURE 14 taken along line XVII—XVII.
Figure 15:
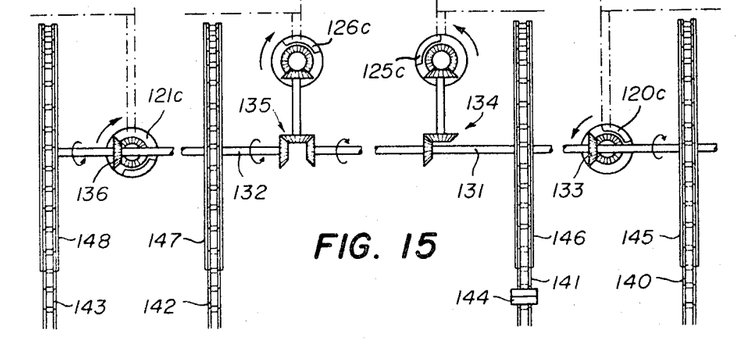
FIGURE 15 is a section across the lower end of FIGURE 14.
Figure 16:
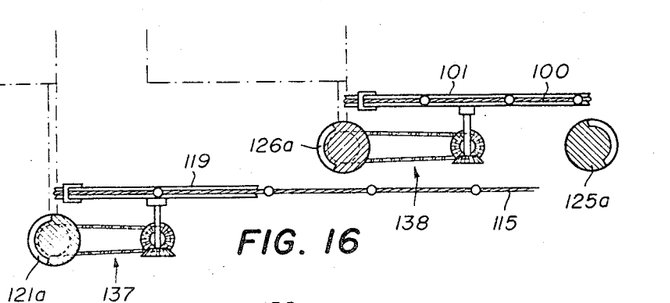
FIGURE 16 is a section taken along line XVI—XVI of FIGURE 14.

The drive means, which are partly visible in FIGURES 8 and 9, are shown in greater detail in FIGURES 14 to 16.

High speed drive along the common transport section is obtained with an endless chain 100 (FIGURE 14), actuated by a drive wheel 101. This chain is made up of cable sections, such as sections 103 and 104, connected to one another by stirrups 102 each having two parts 102a and 102b (FIGURE 14A) which are so arranged that the drive wheel 101 may pass therebetween. These sections carry meshing blocks 105 arranged at regular intervals so as to engage in the notches 106 of wheel 101. The stirrups 102 engage round a drive arm provided on each transport unit, as may be seen in FIGURE 17 with the arm 107 of unit 108 and with the arm 109 of unit 110.

The open end of the stirrups 102 is directed to the outside of the loop formed by chain 100.

The drive along the first portion of each of the link sections is provided by an auxiliary endless chain associated with two contiguous link sections, one divergent and one convergent, along which travel the units of one set. This is what is shown in FIGURE 14 for the auxiliary chain 115, which is constructed in the same way as chain 100 and which is associated with the divergent section along which travel the units of set B, for instance unit 116, and with the contiguous convergent section along which travel these same units, for instance unit 117. This chain 115 is located at a level below that of chain 100 as shown in FIGURE 17; it passes over return wheels 118 and 119, of which one, i.e. wheel 119, acts as drive wheel, and over a third return wheel 114. The return wheel 118 is so positioned that the point where chain 115 engages it coincides with the beginning 120a of a variable pitch curvilinear screw 120. Similarly the return wheel 119 is so placed that the point where chain 115 disengages it coincides with the end 121a of a variable pitch curvilinear screw 121. These curvilinear screws are located below the corresponding link sections so that the lower ends of the drive arms may cooperate with the groove of each of these screws, as shown in FIGURE 16, during the entire run along these link sections. The curvilinear screws moreover extend beneath the loading and unloading sections associated with these link sections. The curvilinear screws 120 and 121 have the same hand and their pitch varies from a high value at extremities 120a and 121a to a low value at locations 120b and 121b which respectively coincide with the beginning and end of the loading and unloading sections along which the units travel in the direction represented by the arrows 122 and 123. From point 120b to the extremity 120c, the screw has a constant pitch of low value thereby imparting to the units the low speed they must have along the unloading section. The same applies to screw 121, between the extremity 121c and point 120b so that it may impart to the units the low speed they must have along the loading section.

As for the units of set C, they are required to travel along rectilinear link sections so that the associated screws 125 and 126 are rectilinear. These screws have a variable pitch, in positions 125a to 125b and positions 126a and 126b, and have a constant pitch in positions 125b to 125c and positions 126b to 126c. They are placed at a level higher than that of screws 120 and 121 so that the auxiliary chain 115 may pass beneath them.

The rotation of screws 120 and 125 takes place in the same direction, which is opposite to that of screws 121 and 126, and since they have identical threads they will drive the units in the required directions. Their rotational speeds must be identical to and in synchronism with the speeds of chains 110 and 115. That is why they are actuated by a common motor 130 through the intermediary of two common shafts 131 and 132, of bevel gearing units 133 and 136, unit 135 moreover serving to reverse the direction of rotation of shaft 132 in relation to shaft 131. The terminal portions 121a and 126a of screws 121 and 126 furthermore carry transmission means 137 and 138 to rotate the drive wheels 119 and 101 which actuate chains 115 and 100. Consequently all of the drive means are synchronised with one another. There must of course also be phase concordance between the rotation of the screws and the motion of the chains so that when a drive arm leaves a stirrup of a chain, its end comes into engagement with the beginning of the groove of the associated screw, and so that when a drive arm reaches the end of a screw it comes into engagement with a stirrup of the associated chain.

Along each of the off-setting ramps that are contiguous to the loading and unloading sections, e.g. ramp 56 (FIGURE 9), the units are driven by chains, such as chain 141, carrying hooks 144. Each ramp is provided with one of these chains, which are actuated by wheels 145 to 148 carried by shafts 131 and 132 respectively.

Auxiliary drive means, consisting of a notched wheel 7 (FIGURE 8) actuated by a shaft 8 connected to a shaft 149 via a transmission 9 ensures displacement of the units along the return loop, with the notches 6 of wheel 7 cooperating with the drive arms 5. In the case of the units of set B travelling along a return loop of larger radius, these drive means are formed by an auxiliary chain similar to the auxiliary chain 115 (FIGURE 14).

The drive system just described is that which is provided for the main station of a transport complex with two sets of transport units, such as sets B and C (FIGURE 2), for dealing with traffic to and from two distinct destinations. In each of the secondary stations is provided a similar arrangement, including variable pitch curvilinear screws, an auxiliary chain and downward off-setting chains.

The guide system comprises, in addition to the two-rail aerial track 86 (FIGURE 5), which must be interrupted at the points of convergence and at the points of divergence, carrier rollers 87 (FIGURE 14) placed fore and aft of these points so as to support the units on that side where they are no longer suspended, i.e. on the inside in the case of units moving onto a divergent section (rollers 87a) or coming from a convergent section (rollers 87b), and on the outside in the case of units travelling straight on (rollers 87c and 87d). The sorting of units B, which travel along the divergent or convergent sections, and of units C, which travel straight on, is carried out by auxiliary guides 88 and 89 respectively, with which cooperate switching arms such as the arm 90 carried by unit 110 visible in FIGURE 17. These arms are located at different distances, depending on the set to which the units carrying them belong: thus units B carry switching arms which are spaced further than those of units C, so that the arms of units B cooperate with the auxiliary guides 88 whereas those of units C cooperate with the auxiliary guides 89.

Figure 18:
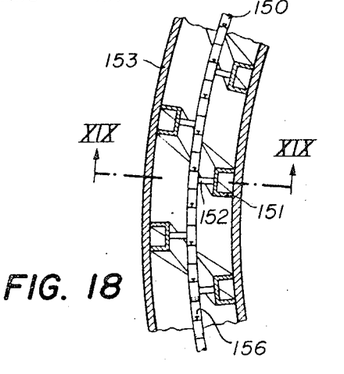
FIGURE 18 is a longitudinal section, on an enlarged scale, of a part of FIGURE 14.
Figure 19:
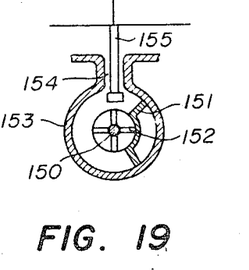
FIGURE 19 is a cross-section taken along line XIX—XIX of FIGURE 18.

Along the off-setting ramps, the two-rail aerial track 85 is provided with switching mechanism enabling rollers to follow two different rails 92 and 93 whereby the transport units may remain horizontal. This switching mechanism is illustrated on an enlarged scale in FIGURE 9A. It consists of a three-armed member 94 pivotally mounted at its centre about an axis 95. The arms 96 and 97 of this member form a rocking bridge: when member 94 occupies the position shown in chain-dotted lines, arm 96 acts as an extension of rail 86 and when a roller reaches its inner end, it causes member 94 to rock with arm 97 moving into the position shown in full lines. This rocking motion causes arm 96 to lift so that the following roller will be switched onto the downwardly extending rail 93. But the third arm, 98, then finds itself in the path of this following roller so that upon being abutted by the latter, member 94 will pivot in the opposite direction to return to the position illustrated in chain-dotted lines. The third roller that will appear will again pass over rail 92. This switching mechanism thus consists of a rocking device which alternately shunts the rollers onto the horizontal rail 92 and the inclined rail 93. A counter-rail 99 provides forced guiding of the downwardly moving rollers. As for the variable pitch screws, each consists, as shown in FIGURES 18 and 19, of a central core 150 of relatively small diameter to which is secured a deeply channelled member 151 of U cross-section which is twisted to form a helix of variable pitch and which is secured to the core 150 by fixing lugs 152. Core 150 and channelled member 151 are mounted in a trough 153 having along its upper portion a longitudinally extending opening 154 into which project the drive arms of the transport units, as shown with arm 155. Core 150 is made up of short elements hooked on to one another by mortices and tenons 156 which render these elements angularly solid of one another while providing the whole with a flexibility such as to enable it to adapt itself to the large radius curves formed by the trough 153.

Finally, the opening and closing of the units is carried out by arms which are rigid with the panels forming the transverse walls. These arms are represented in FIGURE 5. This figure shows how arms 81a and 81b, respectively mounted on panels 48a and 48b, cooperate with opening and closing guides 82a and 82b. These guides move away from the units when the latter are to be opened and move closer thereto for the closure thereof. FIGURE 5 shows, in the case of unit 51, the position of arms 81a and 81b and of guides 82a and 82b when the unit is open, and, in the case of unit 52, the position of arms 83a and 83b and of guides 84a and 84b when this latter unit is closed.

Figure 10:
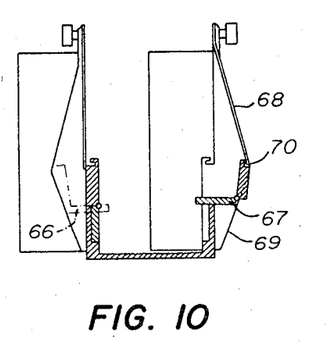
FIGURE 10 shows a modified constructional form of transport unit for the complex.

To improve the comfort of the transport units, the latter are provided with retractable seats having backs, as shown in FIGURE 10 for seats 66 and 67. These seats, when in their retracted position, disappear in the fixed longitudinal walls and, in their operative position, push the movable panels 68 and 89, with which these walls are provided, sideways. The protuberance 70 of these panels does not project beyond the outermost limit of the panels of the retractable transverse walls when the latter are open.

Figure 11:
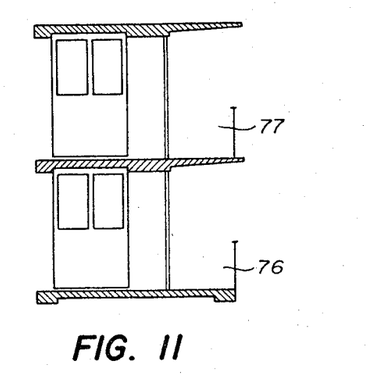
FIGURES 11 to 13 show three alternatives for the relative arrangement of the transport units.

In the embodiment just described, the "in" and "out" lines of the common transport section are disposed side by side at the same level. This is in particular apparent from FIGURES 5 and 6. In order to decrease the space occupied widthwise by such an arrangement, the lines can be superposed. This is what is shown in FIGURE 11 where a line 71, e.g. the "out" line, is seen to overlie a line 72, e.g. the "in" line.

Figure 12:
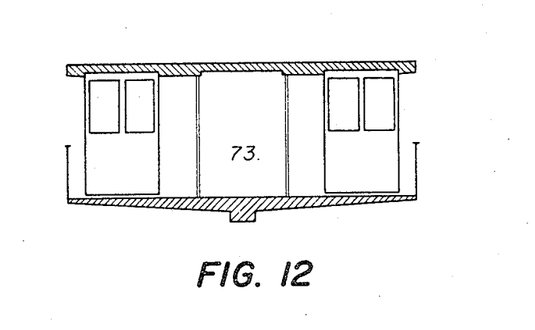
Figure 13:
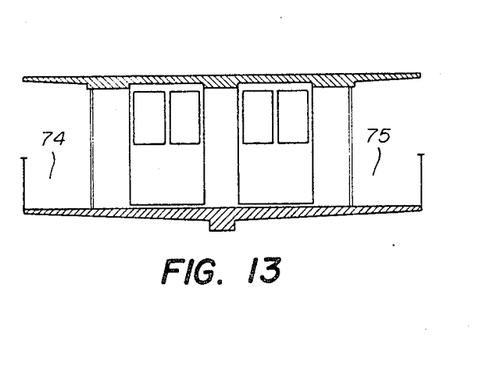

FIGURES 12 and 13 illustrate variants of the side by side arrangement of the "in" and "out" lines of the common transport section. In FIGURE 12, these lines are spaced apart so that it is possible to provide therebetween an emergency passage 73 enabling passengers to travel on foot in case of breakdown. In FIGURE 13, the lines are positioned close to one another and the emergency passages are formed by lateral galleries 74 and 75. These emergency passages in the FIGURE 11 variant, are formed by superposed galleries 76 and 77.

Briefly, the transport complex provided by the invention comprises n sets of transport units, with one set per destination, for accommodating passengers, a guide and drive system for conveying the transport units of one of said sets along a closed circuit connecting the main station to one of the n secondary stations, and 2n platform means to enable boarding or alighting of passengers at the main station and at the secondary stations. Each transport unit comprises a floor, two longitudinally extending fixed walls, and two retractable transversely extending walls. The guide and drive system consists of: a common transport section, which includes an "out" line and an "in" line, dealing with the entire traffic between the main station and the n secondary stations; 2n boarding sections and 2n alighting sections, of which one boarding section and one alighting section are located in each of the secondary stations and of which n boarding sections and n alighting sections are located in the main station within which they are grouped in pairs, each pair comprising the boarding section and the alighting section dealing with the traffic to and from a particular secondary station; 2n link sections each connecting a boarding section or an alighting section to the common transport section; and 2n return loops of which one is located in each of the secondary stations, connecting the boarding and alighting sections of this station along a vertically off-set path in relation to said latter sections and of which n are located in the main station where each connects the boarding and alighting sections of a pair along a vertically offset path in relation to said latter sections. The guide and drive system is adapted to impart to the transport units an invariable course which, for a set, consists of: the boarding section of the associated pair in the main station, which is travelled along at low speed and in a close formation within which the transport units contact one another end to end; the associated link section which is travelled along at a speed progressively increasing from said low speed to a high speed; the "out" line of the common transport section which is travelled along at said high speed and in an open formation within which the transport units are spaced apart; the link section associated with the alighting section of the secondary station served by this set of units, which section is travelled along at a speed progressively decreasing from said high speed to a low speed; the alighting section of this station, its return loop and its boarding section, all three travelled along at low speed and in close formation; the link section associated with this boarding section, which is travelled along at a speed progressively increasing from said low speed to said high speed; the "in" line of the common transport section which is travelled along at high speed and in open formation; the link section associated with the alighting section of the considered pair of the main station, which is travelled along at a speed progressively decreasing from said high speed to said low speed; the associated alighting section and return loop, which are travelled along at low speed and in close formation. The guide and drive system is moreover adapted to ensure synchronisation of the motion of the transport units and conveyance thereof, such that the units are distributed along the common transport section in successive groups within which a unit of a set $k$ follows a unit of the set $k+1$, which latter unit follows a unit of the set $k+2$ and so on, this sequential order remaining invariable. The $2n$ platform means are distributed so as to have two located in each of the $n$ secondary stations and $n$ located in the main station. Each platform means includes: a fixed stage associated with each boarding or alighting section and arranged axially thereof in cantilevered manner over the return loop end portion which is contiguous to said boarding or alighting section; means for closing the retractable transversally extending walls of the transport units when leaving the boarding section and opening said retractable transversally extending walls when the transport units reach an alighting section.

The described transport complex enables uninterrupted high volume and high speed traffic, which, although requiring of the passengers to have selected their stations of destination before boarding, conveys them there directly and at a high speed without any slowing down when travelling through secondary stations located between the main station and the end of journey secondary stations.

We claim:
1. A continuous and endless passenger transport complex with multiple destinations for connecting, both in the "out" direction and in the "in" direction, a main station, provided with a plurality of platform means with one such platform means for each destination, to at least two secondary stations, each provided with platform means, one of said secondary stations being remote from and the other near to said main station, by means of at least two continuous and endless, variable speed, transport installations, each dealing with the traffic to and from one of said secondary stations and each including a set of transport units, each of which is provided with a floor, two longitudinally extending walls and two transversely extending walls, the latter being retractable, and closed loop guide means along which said transport units are movable, said guide means including, in succession, an unloading section, a return loop, a loading section, all three being arranged within a station and being travelled along by said units at low speed and in close formation, a double line transport section which is travelled along by said units in the "in" and "out" directions at high speed and in open formation, two acceleration sections each arranged between a loading section and one line of the transport section and travelled along by said units at an increasing speed and in a progressively opening formation, and two deceleration sections each arranged between one line of the transport section and an unloading section and travelled along by said units at a decreasing speed and in a progressively closing formation, and drive systems adapted to impart to the transport units of said installation a speed which varies between said low speed and said high speed; wherein at least a portion of the guide means associated with an installation serving a remote secondary station constitutes at least a portion of the transport section of the guide means associated with an installation serving a near secondary station, the ends of this common portion of the two transport sections forming divergence and convergence points of these two guide means, wherein, in a near secondary station, at least the return loop of the guide means associated with the installation serving this secondary station is off-set vertically in relation to the transport section of the guide means associated with any installation serving a remote secondary station, wherein, at said points of convergence, the distance between two successive transport units of the installation serving the near secondary station enables a group of units including one unit from each of the installations serving remote secondary station to fit in between these two successive units, wherein the drive systems belonging to each of the installations are synchronised so that, within each group, the units belonging to one of the installations follow those belonging to another installation in an unvarying order of succession, and wherein, in the main station, the return loop of the guide means associated with an installation serving one secondary station is located on the outside of the return loop of the guide means associated with an installation serving a different secondary station.

2. A transport complex according to claim 1, wherein each station includes, for each of the loading and unloading sections, a horizontal stage which projects in cantilevered manner over the floors of the transport units moving along said sections and between the longitudinal walls of said units, and which grazes said floors to provide continuity between said stage and the mobile passageway formed by those transport units moving in close formation and having their transverse walls retracted.

3. A transport complex according to claim 2, wherein, in each of said stations, said return loop is off-set downwardly, with the transport units disappearing under said stages.

4. A transport complex according to claim 3, wherein, in said main station, the stages associated with each of the installations are all located at the same level, with the return loops of these installations arranged concentrically to one another.

5. A transport complex according to claim 1, wherein automatic retraction of said transverse walls when said units reach, in close formation, said unloading section and the automatic closure of these transverse walls when these units leave, in said close formation, said loading section.

References Cited

UNITED STATES PATENTS

| 2,905,100 | 9/1959 | Kendall | 104—25 |
| 2,905,101 | 9/1959 | Sinden | 104—25 |
| 2,981,202 | 4/1961 | Turner | 104—25 |
| 3,236,191 | 2/1966 | Bouladon | 104—25 |
| 3,238,893 | 3/1966 | Zuppiger | 104—25 |
| 3,352,250 | 11/1967 | Bouladon | 104—25 |

DRAYTON E. HOFFMAN, *Primary Examiner.*

D. F. WORTH, *Assistant Examiner.*

U.S. Cl. X.R.

104—28, 30

UNITED STATES PATENT OFFICE
CERTIFICATE OF CORRECTION

Patent No. 3,431,866                                             March 11, 1969

Gabriel Bouladon et al.

It is certified that error appears in the above identified patent and that said Letters Patent are hereby corrected as shown below:

Column 6, line 58, "133 and 136" should read -- 133 to 136 --. Column 10, line 54, after "wherein" insert -- said platform installations include means for causing --.

Signed and sealed this 31st day of March 1970.

(SEAL)
Attest:

Edward M. Fletcher, Jr.                                  WILLIAM E. SCHUYLER, JR.

Attesting Officer                                              Commissioner of Patents